US007549185B2

(12) United States Patent
Yang

(10) Patent No.: US 7,549,185 B2
(45) Date of Patent: Jun. 23, 2009

(54) METHOD FOR MAKING A COMPONENT OF A BOOT BODY FOR A SKATING SHOE

(75) Inventor: Hsin-Chih Yang, Kaohsiung (TW)

(73) Assignee: Sakurai Sports Mfg. Co., Ltd., Kaohsiung Hsien (TW)

( * ) Notice: Subject to any disclaimer, the term of this patent is extended or adjusted under 35 U.S.C. 154(b) by 583 days.

(21) Appl. No.: 11/484,190

(22) Filed: Jul. 11, 2006

(65) Prior Publication Data

US 2008/0012171 A1 Jan. 17, 2008

(51) Int. Cl.
*A43B 7/20* (2006.01)
*A43B 5/04* (2006.01)
*B29C 33/40* (2006.01)

(52) U.S. Cl. .................... 12/142 P; 12/145; 12/146 D; 36/115; 36/89; 264/244; 264/223

(58) Field of Classification Search ............... 12/142 P, 12/145, 146 D, 142 T; 36/89, 115; 264/222, 264/223, 225
See application file for complete search history.

(56) References Cited

U.S. PATENT DOCUMENTS 4,650,625 A * 3/1987 Pentlow ..................... 264/225
4,793,882 A * 12/1988 Brehmer et al. ............. 156/235
6,871,424 B2 * 3/2005 Labonte et al. ............... 36/115
7,316,083 B2 * 1/2008 Labonte ....................... 36/115
2004/0016150 A1 * 1/2004 Labonte et al. ............... 36/115
2005/0116379 A1 * 6/2005 Goldsmith et al. .......... 264/222
2005/0126046 A1 * 6/2005 Labonte et al. ............... 36/115
2005/0210709 A1 * 9/2005 Labonte ......................... 36/89
2005/0281999 A1 * 12/2005 Hofmann et al. ......... 428/304.4
2006/0003160 A1 * 1/2006 Goldberg .................... 428/343

* cited by examiner

*Primary Examiner*—Ted Kavanaugh
(74) *Attorney, Agent, or Firm*—William E. Pelton, Esq.; Cooper & Dunham LLP

(57) ABSTRACT

A method for making a component of boot body for a skating shoe includes a cutting step, a mold-making step, a coating step and a shaping step. The cutting step cuts a flexible sheet to form a base sheet with at least one predetermined coating area. The mold-making step forms a coating mold with at least one coating slot. The coating step applies epoxy resin to the base sheet to form a layer of epoxy resin coating and applies the epoxy resin to the at least one predetermined coating area through the at least one coating slot to integrally form at least one reinforcement on the base sheet. The shaping step heats and pressurizes the base sheet to form a component of a boot body. The at least one reinforcement provides an improved hardness and impact strength to the boot body and keeps a user's foot from injury.

9 Claims, 10 Drawing Sheets

1b
20
10
2
10
20
30
10
20
1a

METHOD FOR MAKING A COMPONENT OF A BOOT BODY FOR A SKATING SHOE

BACKGROUND OF THE INVENTION

1. Field of the Invention

The present invention relates to a method for making a component of a boot body for a skating shoe, and more particularly to a method for making a component of a boot body for a skating shoe to reinforce the hardness and impact strength of the boot body and to lighten the weight of the boot body.

2. Description of Related Art

At present, a conventional method of making a boot body of a skating shoe, such as a roller skate, an ice skate or the like, uses leather, polyvinyl chloride (PVC), hard polyurethane elastomer (PU) or textile cloth to substantially form the boot body with stitches. To reinforce the hardness of the boot body, reinforcements, such as chemical sheets, cabretas or leathers are attached to a lining that is put inside the boot body. Then, a tongue is joined to the boot body with stitches and a sole is adhered to the boot body. Further, wheels or a blade is mounted on the sole to form a skating shoe.

Another conventional method of making a boot body uses injection molding to form the boot body. Likewise, reinforcements, such as chemical sheets, cabretas or leathers are attached to a lining that is put inside the boot body to reinforce the hardness of the boot body. Then, wheels or a blade is mounted on the boot body to form a skating shoe.

The skating shoe is used in speed skating, figure skating or hockey games so the skating shoe must have a light weight, a high hardness and a high impact strength to protect a foot of a user from injury and to help the user to have an excellent performance. However, the reinforcements attached to the lining do not join with the boot body, so the reinforcements directly press the foot to make the user uncomfortable. Further, the reinforcements increase the weight of the skating shoe and influence the performance of the user.

SUMMARY OF THE INVENTION

The primary objective of the present invention is to provide a method for making a component of a boot body of a skating shoe to overcome the aforementioned problems.

The method for making a component of a boot body of a skating shoe comprises a cutting step, a mold-making step, a coating step and a shaping step.

The cutting step cuts a flexible sheet to form a base sheet with at least one predetermined coating area. The mold-making step forms a coating mold with at least one coating slot corresponding to the at least one predetermined coating area of the base sheet.

The coating step applies epoxy resin to the base sheet to form a layer of epoxy resin coating on the base sheet, aligns the at least one coating slot of the coating mold with the at least one predetermined coating area of the base sheet after the layer of epoxy resin coating is solidified and then applies at least one layer of the epoxy resin to the at least one predetermined coating area through the at least one coating slot to form at least one reinforcement.

When the epoxy resin is solidified, the at least one reinforcement provides an improved hardness and impact strength to the boot body to keep a user's foot from injury. Further, the at least one reinforcement is formed integrally on the base sheet to avoid directly pressing the foot and makes the user comfortably.

The shaping step heats and pressurizes the base sheet on a boot last to form a boot body after the base sheet is cooling.

Other objectives, advantages and novel features of the present invention will become more apparent from the following detailed description when taken in conjunction with the accompanying drawings.

DETAILED DESCRIPTION OF PREFERRED EMBODIMENT

A boot body of a skating shoe comprises multiple sections including a sole section, two side sections and a heel section. The sole section has two opposite side edges and a rear edge. The side sections are mounted respectively on the opposite side edges of the sole section. The heel section is mounted on the rear edge of the sole section and joins with the side sections.

Figure 1:
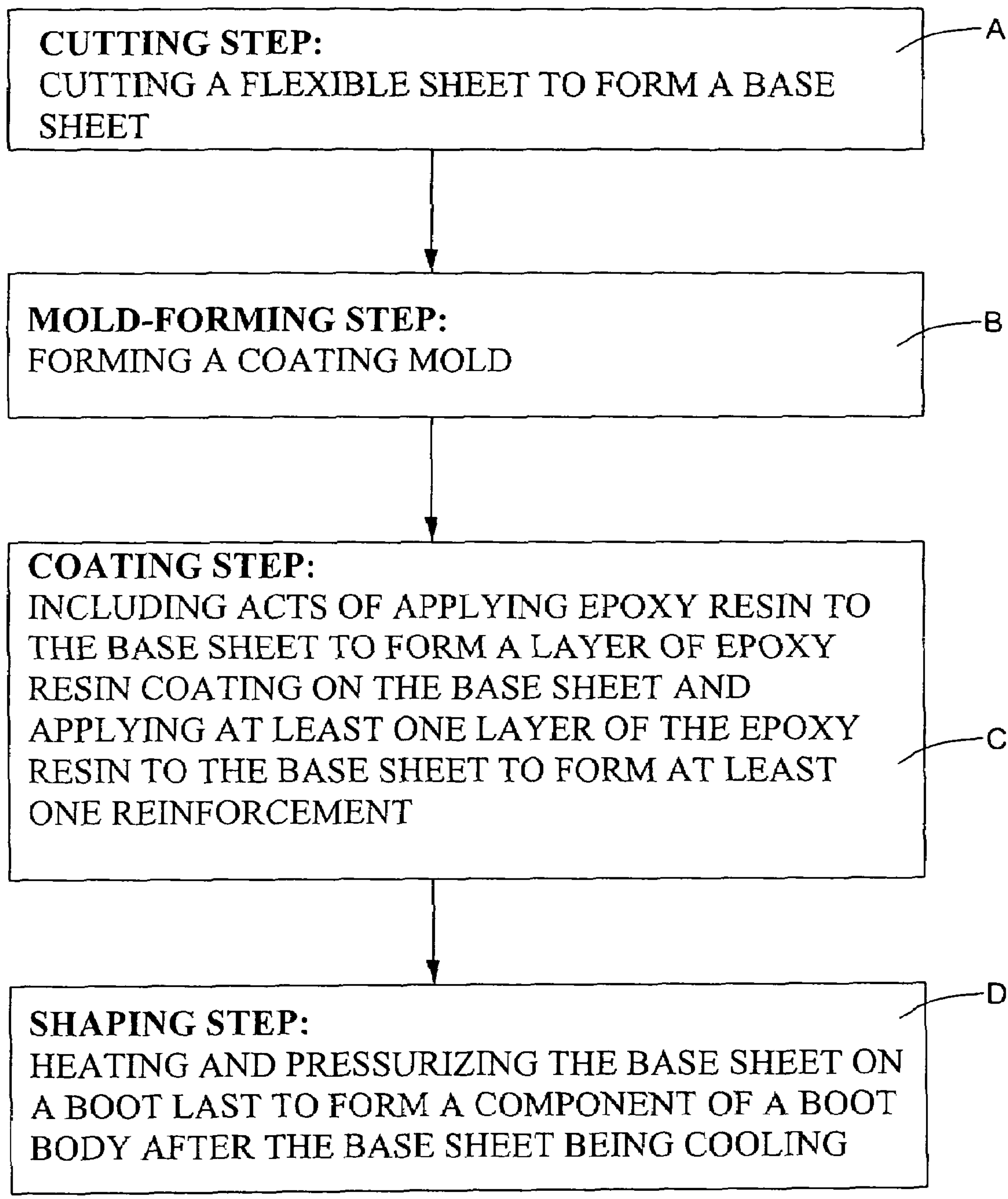
FIG. 1 is a block diagram of steps of a first embodiment of a method for making a component of a boot body of a skating shoe in accordance with the present invention.
Figure 2:
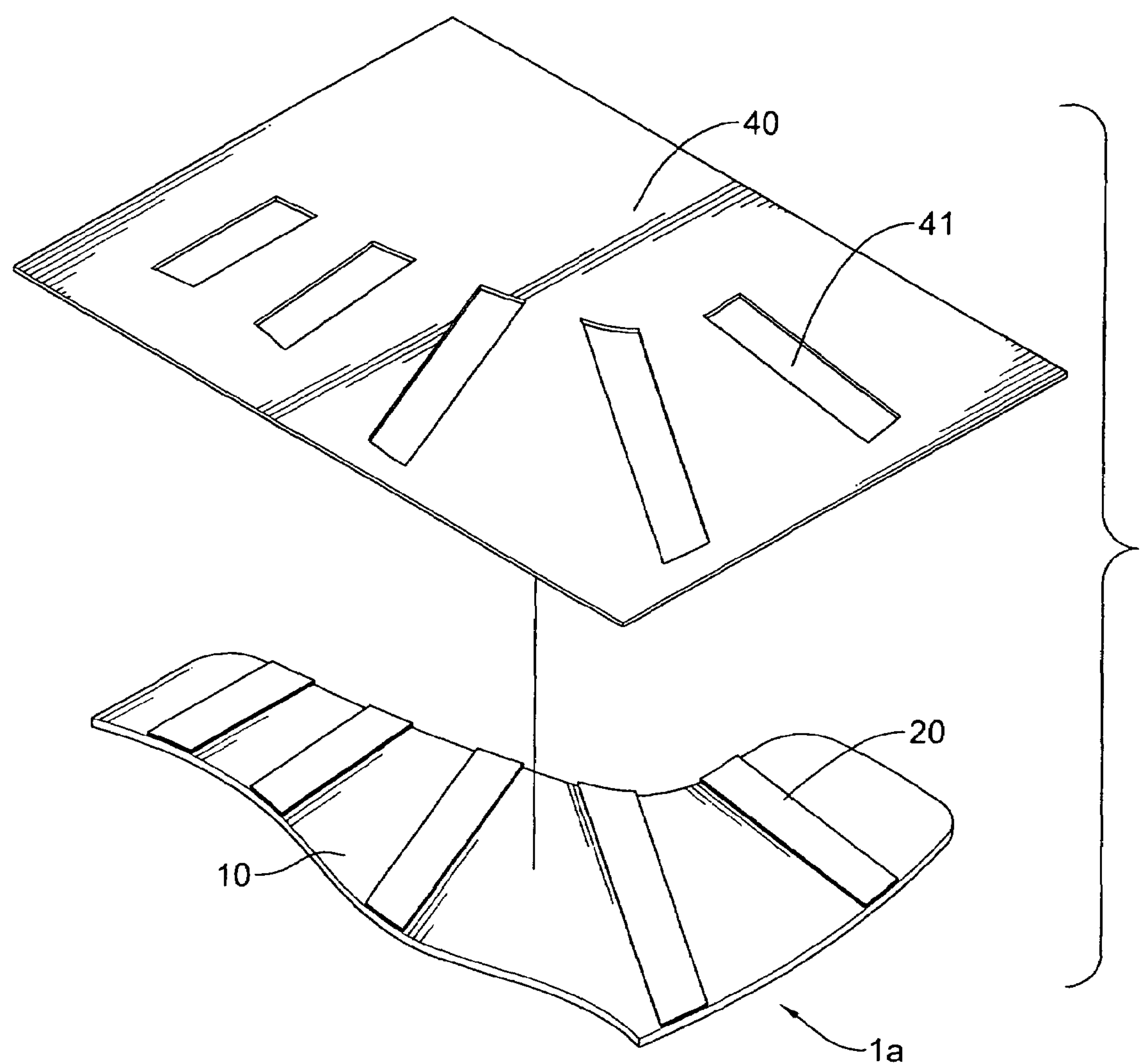
FIG. 2 is an exploded perspective view of a coating mold with a side sheet made by the method in FIG. 1.
Figure 3:
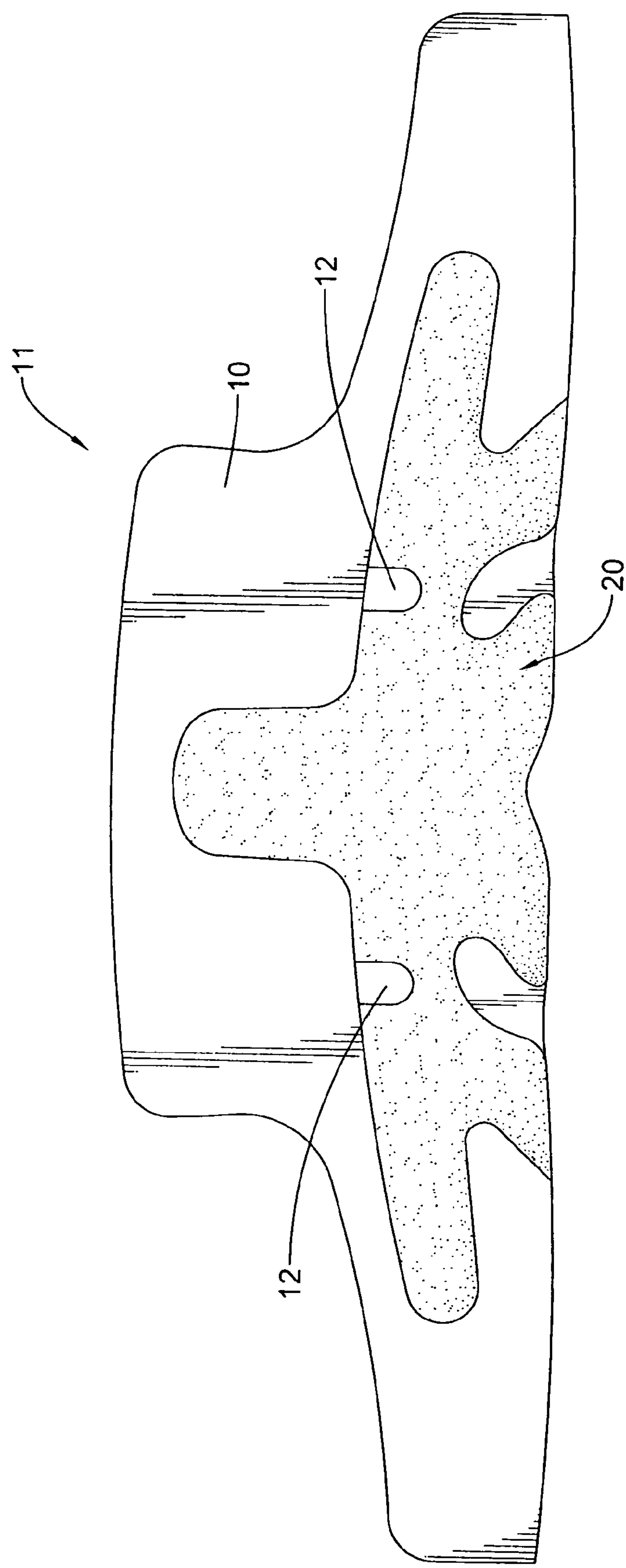
FIG. 3 is a front view of a side-plus-heel sheet made by the method in FIG. 1.

With reference to FIG. 1, a method for making a component of a boot body in accordance with the present invention comprises a cutting step (A), a mold-making step (B), a coating step (C) and a shaping step (D).

With further reference to FIGS. 2, 3 and 6-10, the cutting step (A) is cutting a flexible sheet to form a base sheet (10) with at least one predetermined coating area. The flexible sheets may be made of hard polyurethane elastomer (PU) or fiber-textile pre-preg. The base sheet (10) may be a one-piece side sheet (1*a*, 1*b*) corresponding to one of the side sections of the boot body, may be a one-piece heel sheet (2) corresponding to the heel section of the boot body or may be a side-plus-heel sheet (11) having multiple optional ventilating holes (12) and two side sections and a heel section formed in an integral piece. The side sections of the side-plus-heel sheet (11) correspond respectively to the side sections of the boot body. The heel section of the side-plus-heel sheet (11) corresponds to the heel sections of the boot body.

The mold-making step (B) is forming a coating mold (40) with at least one coating slot (41) and an optional sole mold (50) with a sole recess (51). The at least one coating slot (41) corresponds to the at least one predetermined coating area of the base sheet (10). The sole recess (51) corresponds to the sole section of the boot body and has two opposite side edges and a rear edge.

Figure 4:
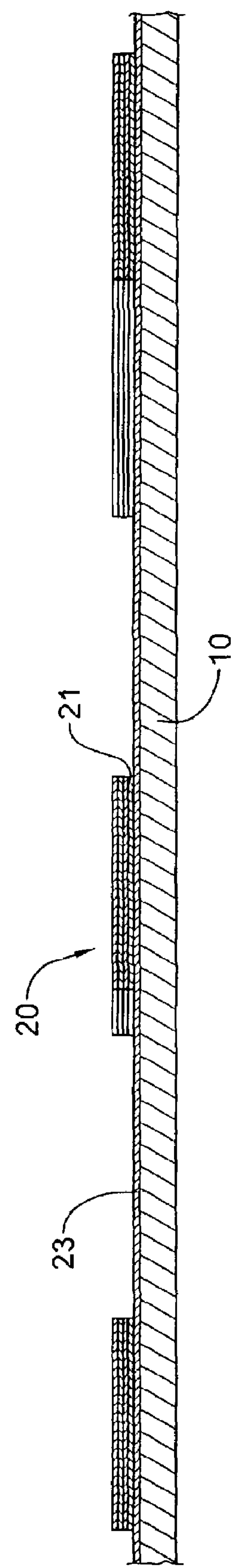
FIG. 4 is a cross-sectional side plane view of reinforcements made by the method in FIG. 1.
Figure 5:
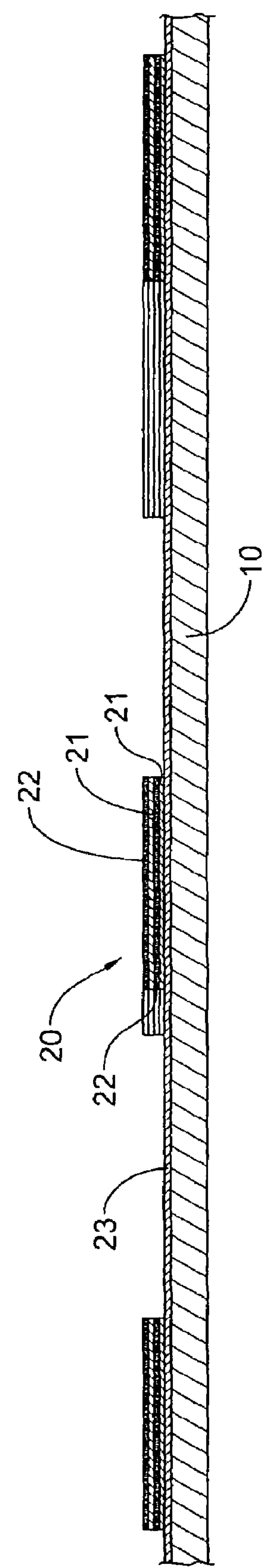
FIG. 5 is a cross-sectional side plane view of the reinforcements made by the method in FIG. 1 with fiber textiles being added to the reinforcements.
Figure 6:
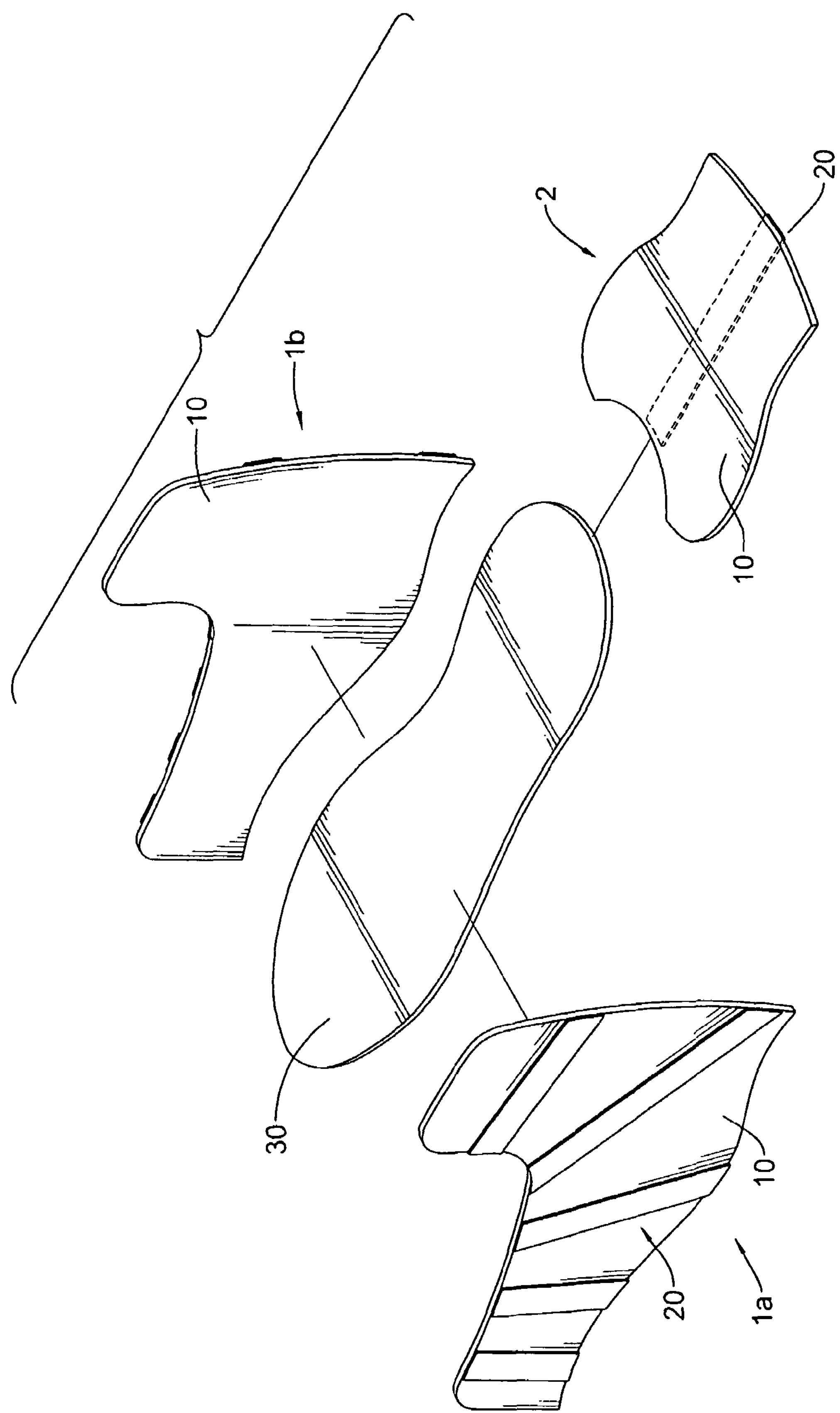
FIG. 6 an exploded perspective view of multiple base sheets made by the method in FIG. 1, FIG. 7 an exploded perspective view of multiple base sheets made by the method in FIG. 1 with a side sheet and a sole sheet being joined together.

With further reference to FIGS. 4 and 5, the coating step (C) is applying epoxy resin to the base sheet (10) and comprises acts of forming a layer of epoxy resin coating (23) on the base sheet (10), aligning the at least one coating slot (41) of the coating mold (40) with the at least one predetermined coating area of the base sheet (10) after the layer of epoxy resin coating (23) is solidified and applying at least one layer of epoxy resin to the at least one predetermined coating area through the at least one coating slot (41) to form at least one reinforcement (20). The coating step (C) may be implemented in several ways. The at least one reinforcement (20) becomes hardened when the epoxy resin is solidified, is formed integrally on the base sheet (10) and has at least one layer (21) to form an enough thickness. So the at least one reinforcements (20) provides enhanced hardness and impact strength to the boot body and effectively protects a user's foot from injury. In addition, the at least one reinforcement can avoid directly pressing the foot and makes the user comfortable. Further, the at least one reinforcement (20) do not impose additional weight to the skating shoe to influence a performance of the user.

Figure 10:
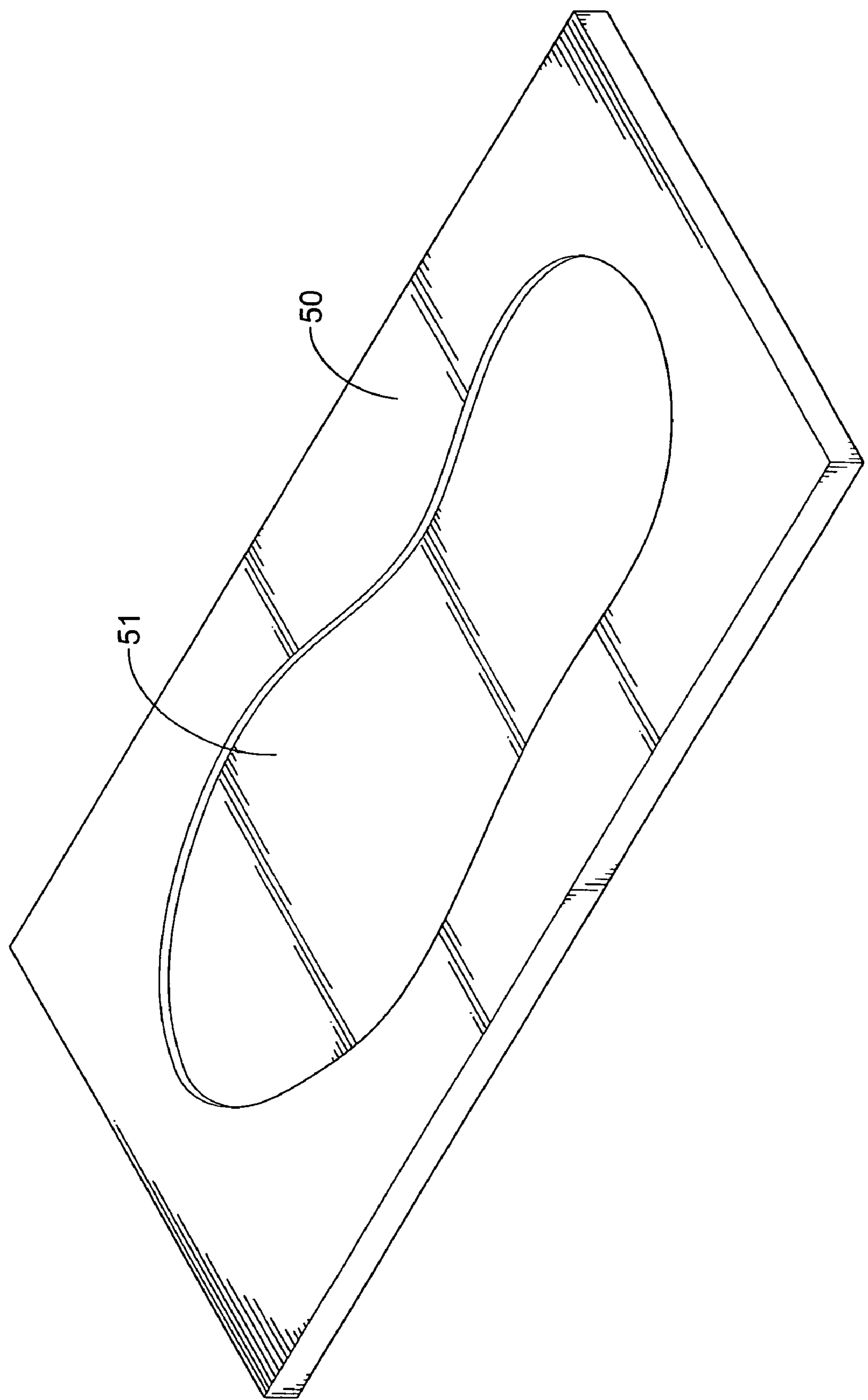
FIG. 10 is a perspective view of a sole mold fitting with the method in FIG. 1.

With further reference to FIG. 10, in a first embodiment of the coating step (C), the coating step (C) applies the epoxy resin to the sole recess (51) of the sole mold (50) to form a sole sheet (30).

Figure 7:
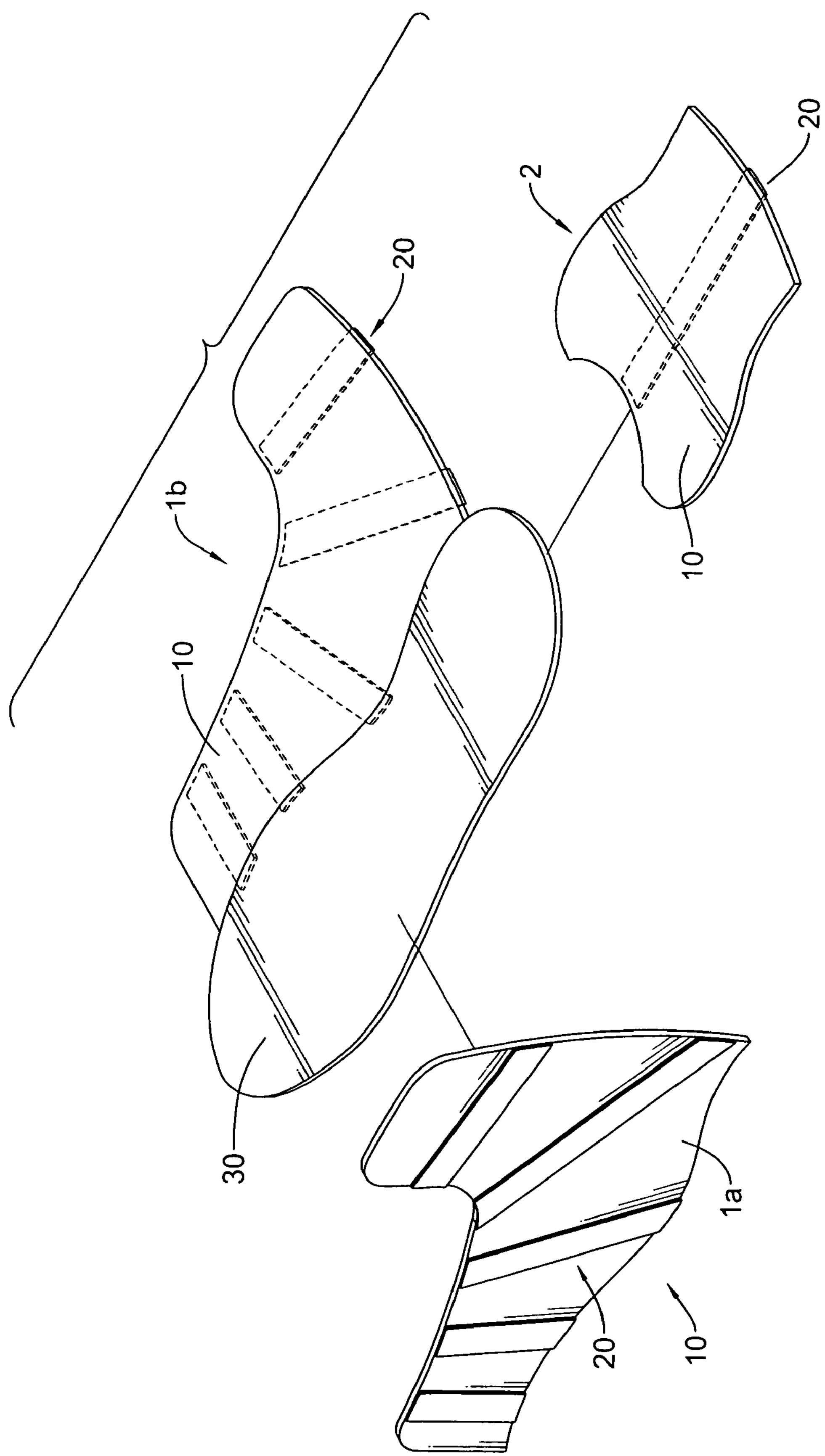

With further reference to FIG. 7, in a second embodiment of the coating step (C), the side sheet (1*a*, 1*b*) is placed adjacent to one of the side edges of the sole recess (51) of the sole mold (50) and the epoxy resin is applied to the side sheet (1*a*, 1*b*) and the sole recess (51) to form the layer of epoxy resin coating (23) on the side sheet (1*a*, 1*b*) and a sole sheet (30) integrally joined with the layer of epoxy resin coating (23) on the side sheet (1*a*, 1*b*).

Figure 8:
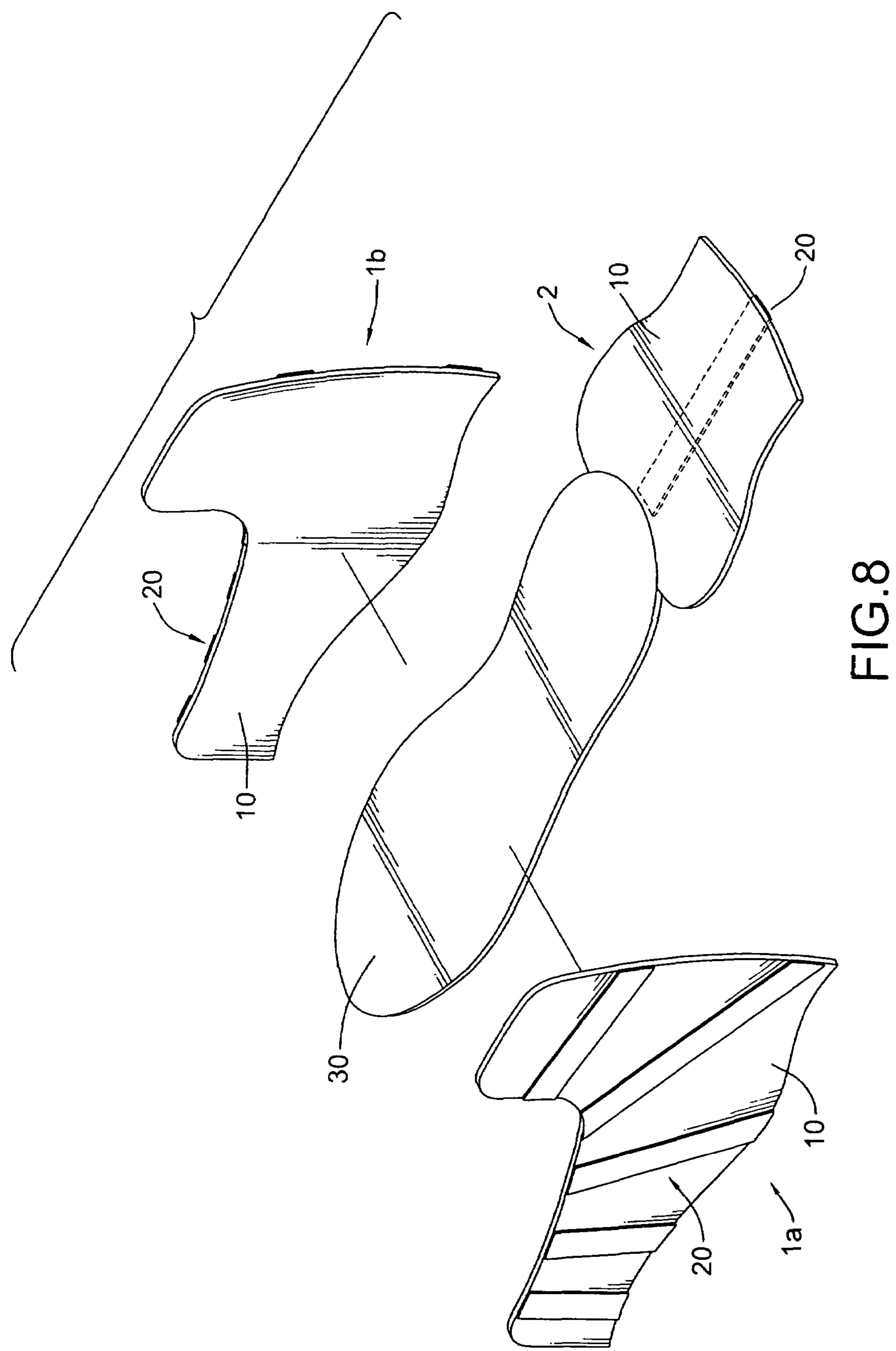
FIG. 8 an exploded perspective view of multiple base sheets made by the method in FIG. 1 with a heel sheet and the sole sheet being joined together.
Figure 9:
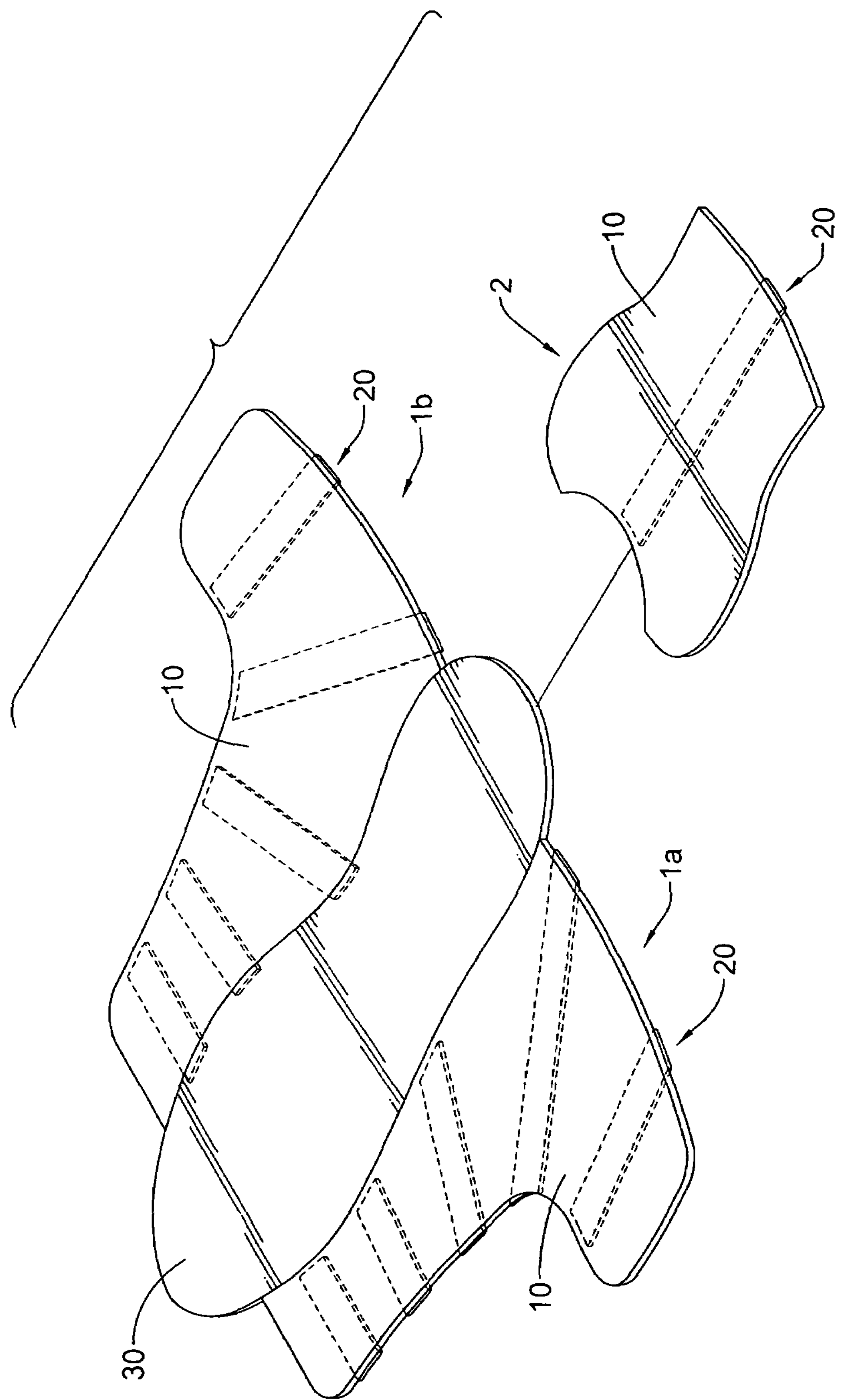
FIG. 9 an exploded perspective view of multiple base sheets made by the method in FIG. 1 with two side sheets and the sole sheet being joined together.

With further reference to FIG. 8, in a third embodiment of the coating step (C), the heel sheet (2) is placed adjacent to the rear edge of the sole recess (51) of the sole mold (50) and then the epoxy resin is applied to the heel sheet (2) and the sole recess (51) to form the layer of epoxy resin coating (23) and a sole sheet (30) integrally joined with the layer of epoxy resin coating (23) on the heel sheet (2).

With further reference to FIG. 5, in a forth embodiment of the coating step (C), fiber textiles (22) or reinforced material such as injection-molded piece, metal piece and the like can be added to the at least one reinforcement (20) during applying the epoxy resin to the at least one predetermined coating area of the base sheet (10) through the at least one coating slot (41) in the coating mold (40) to form the at least one reinforcement (20) with an improved structural strength.

The shaping step (D) is heating and pressurizing the base sheet (10) on a boot last to form a component of a boot body after the base sheet (10) is cooling.

The method for making a component of a boot body for a skating shoe can be performed to form a heel section and a sole section of the boot body as an integral piece or to form a side section and a sole section of the boot body as an integral piece. It is easy to be derived that how to form two side sections and a sole section of the boot body as an integral piece.

Figure 11:
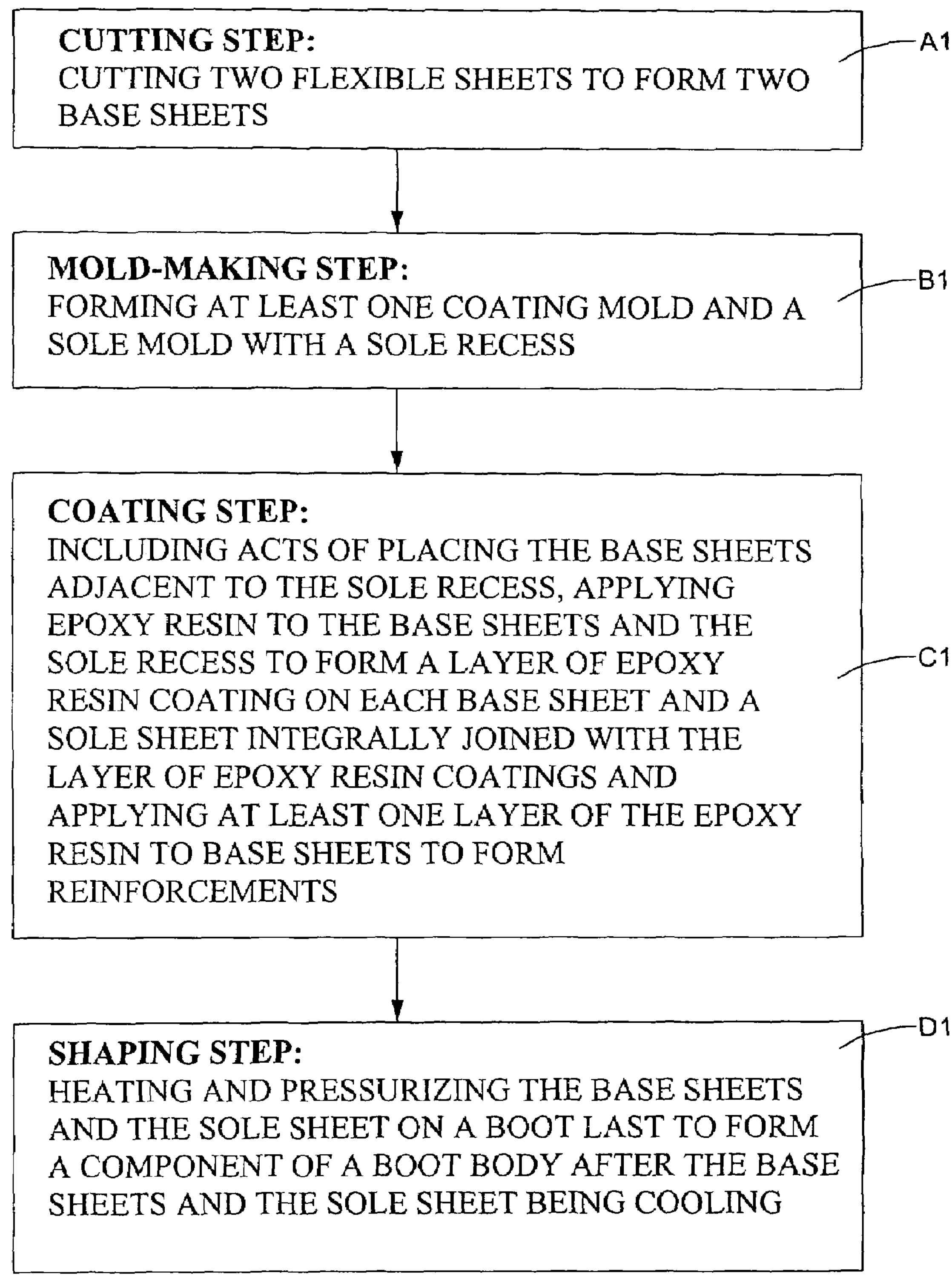
FIG. 11 is a block diagram of steps of a second embodiment of the method for making a component of a boot body of a skating shoe in accordance with the present invention

With further reference to FIG. 11, another implementation of the method for making a component of a boot body for a skating shoe comprises a cutting step (A1), a mold-making step (B1), a coating step (C1) and a shaping step (D1).

The cutting step (A1) is cutting two flexible sheets to form two base sheets (10) with multiple predetermined coating areas. The base sheets (10) are respectively correspond to the side sections of the boot body.

The mold-making step (B1) is forming at least one coating mold (40) with multiple coating slots (41) and a sole mold (50) with a sole recess (51) and may be implemented in several ways. The coating slots (41) correspond to the multiple predetermined coating areas of the base sheets (10). The sole recess (51) has two opposite side edges.

In a first embodiment of the mold-making step (B1), the mold-making step (B1) forms a single coating mold. The single coating mold can cover both the base sheets (10) in a plane and all the coating slots (41) are located in the single coating mold.

In a second embodiment of the mold-making step (B1), the mold-making step (B1) forms two coating molds (40). The coating molds (40) correspond respectively to the base sheets (10) and the coating slots (41) may be distributed in both coating molds (40).

The coating step (C1) includes acts of placing the base sheets (10) respectively adjacent to the opposite side edges of the sole recess (51) of the sole mold (50), applying epoxy resin to the base sheets (10) and the sole recess (51) to form a layer of epoxy resin coating (23) on each base sheet (10) and a sole sheet (30) integrally joined with the layer of epoxy resin coatings (23) on the base sheets (10), aligning the coating slots (41) of the at least one coating mold (40) with the predetermined coating areas of the base sheets (10) after the layer of epoxy resin coatings (23) being solidified and applying at least one layer of the epoxy resin to the predetermined coating areas through the coating slots (41) to form reinforcements (20). The reinforcements (20) are formed integrally on the base sheets (10) and each having at least one layer.

The shaping step (D1) is heating and pressurizing the base sheets (10) and the sole sheet (50) on a boot last to form a component of a boot body after the base sheets (10) and the sole sheet (50) being cooling. The component formed in the shaping step (D1) forms the side sections and the sole section of the boot body in an integral piece.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for making a component of a boot body for a skating shoe comprising:

a cutting step of cutting a flexible sheet to form a base sheet with at least one predetermined coating area;

a mold-making step of forming a coating mold with at least one coating slot corresponding to the at least one predetermined coating area of the base sheet;

a coating step including acts of applying epoxy resin to the base sheet to form a layer of epoxy resin coating on the base sheet;

aligning the at least one coating slot of the coating mold with the at least one predetermined coating area of the base sheet after the layer of epoxy resin coating being solidified; and applying at least one layer of the epoxy resin to the at least one predetermined coating area through the at least one coating slot to form at least one reinforcement formed integrally on the base sheet and each having at least one layer; and a shaping step of heating and pressurizing the base sheet on a boot last to form a component of a boot body after the base sheet being cooling.

2. The method as claimed in claim 1, wherein the base sheet is a one-piece side sheet to form a side section of the boot body.

3. The method as claimed in claim 1, wherein the base sheet is a one-piece heel sheet to form a heel section of the boot body.

4. The method as claimed in claim 1, wherein the mold-making step further forms a sole mold with a sole recess having two opposite side edges and a rear edge; and the coating step further applies the epoxy resin to the sole recess of the sole mold to form a sole sheet.

5. The method as claimed in claim 1, wherein the mold-making step further forms a sole mold with a sole recess having two opposite side edges and a rear edge;

the act of applying epoxy resin to the base sheet to form a layer of epoxy resin coating on the base sheet in the coating step comprises placing the base sheet adjacent to one of the opposite side edges of the sole recess of the sole mold; and applying the epoxy resin to the base sheet and the sole recess to form the layer of epoxy resin coating on the base sheet and a sole sheet integrally joined with the epoxy resin coating on the base sheet; and the sole sheet is heated and pressurized on the boot last together with the base sheet.

6. The method as claimed in claim 1, wherein the mold-making step further forms a sole mold with a sole recess having two opposite side edges and a rear edge;

the act of applying epoxy resin to the base sheet to form a layer of epoxy resin coating on the base sheet in the coating step comprises placing the base sheet adjacent to the rear edge of the sole recess of the sole mold; and applying the epoxy resin to the base sheet and the sole recess to form the layer of epoxy resin coating on the base sheet and a sole sheet integrally joined with the epoxy resin coating on the base sheet; and the sole sheet is heated and pressurized on the boot last together with the base sheet.

7. A method for making a component of a boot body for a skating shoe comprising:

a cutting step of cutting two flexible sheets to form two base sheets with multiple predetermined coating areas;

a mold-making step of forming at least one coating mold with multiple coating slots corresponding to the multiple predetermined coating areas of the base sheets; and a sole mold with a sole recess having two opposite side edges;

a coating step including acts of placing the base sheets respectively adjacent to the opposite side edges of the sole recess of the sole mold;

applying epoxy resin to the base sheets and the sole recess to form a layer of epoxy resin coating on each base sheet and a sole sheet integrally joined with the layer of epoxy resin coatings on the base sheets;

aligning the coating slots of the at least one coating mold with the predetermined coating areas of the base sheets after the layer of epoxy resin coatings being solidified; and applying at least one layer of the epoxy resin to the predetermined coating areas through the coating slots to form reinforcements formed integrally on the base sheets and each having at least one layer; and a shaping step of heating and pressurizing the base sheets and the sole sheet on a boot last to form a component of a boot body after the base sheets and the sole sheet being cooling.

8. The method as claimed in claim 1, wherein fiber textiles are added to the at least one reinforcement during applying the epoxy resin to the at least one predetermined coating area of the base sheet through the at least one coating slot of the coating mold.

9. The method as claimed in claim 7, wherein fiber textiles are added to the reinforcements during applying the epoxy resin to the predetermined coating areas of the base sheets through the coating slots of the at least one coating mold.

* * * * *